(12) United States Patent
Ferguson

(10) Patent No.: US 7,495,688 B2
(45) Date of Patent: Feb. 24, 2009

(54) GENERATING AN MPEG SEQUENCE FOR MULTIPLE CAV MEASUREMENTS

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 533 days.

(21) Appl. No.: 11/099,949

(22) Filed: Apr. 5, 2005

(65) Prior Publication Data

US 2005/0243174 A1 Nov. 3, 2005

(51) Int. Cl.
*H04N 7/12* (2006.01)

(52) U.S. Cl. .................... 348/180; 348/181; 348/189; 348/184

(58) Field of Classification Search .................. 348/180, 348/188–189, 181, 184, 185, 190, 192–193; *H04N 7/12*
See application file for complete search history.

(56) References Cited

U.S. PATENT DOCUMENTS 4,914,506 A * 4/1990 Kafer et al. ................. 348/182
5,001,549 A * 3/1991 Holmbo et al. ............. 348/182
5,343,242 A * 8/1994 Rowsell et al. ............. 348/181
5,920,340 A * 7/1999 Man et al. ................... 348/181

* cited by examiner

*Primary Examiner*—Trang U Tran
(74) *Attorney, Agent, or Firm*—Francis I. Gray

(57) ABSTRACT

A method of generating an MPEG sequence for multiple component analog video measurements modifies a general purpose encoder and provides an MPEG encoded signal to test a device under test (DUT) component analog output that is valid in both RGB and YPbPr in both pulse and bar and that solves digital RGB cross-talk due to aliasing of Cb and Cr in 4:0:0 and 4:4:4 formats. The general purpose encoder is modified by removing vertical pre-filtering and post-filtering, altering quantization tables alternate scanning for vertical redundancy, and turning off motion estimation. The input to the MPEG encoder is pre-aliased to provide minimum digital cross-talk after MPEG compression by repeating every other sample.

4 Claims, 3 Drawing Sheets

Rline, Gline, Bline preAliasedR', preAliasedG', preAliasedB'

GENERATING AN MPEG SEQUENCE FOR MULTIPLE CAV MEASUREMENTS

BACKGROUND OF THE INVENTION

The present invention relates to video measurements, and more particularly to a method of generating an MPEG (Moving Picture Experts Group) encoded signal for component analog video (CAV) measurement of linearity, channel delay, cross-talk and short time distortion.

A test signal for measuring component analog video, such as Y,Pb,Pr or RGB component video, has to solve the following problems:

for each measurement one line for all three component channels valid in both RGB and YPbPr: ramps, sweeps, pulse and bar, etc.

digital RGB cross-talk due to aliasing of Cb and Cr in 4:0:0 to 4:4:4 formats

EAV (end active video) and SAV (start active video) meet specifications even with missing samples macro-block boundaries A corresponding encoder/decoder has to solve the following problems:

remove vertical pre-filter remove vertical post-filter alter quantization tables alternate scanning for vertical boundary motion estimation turned off.

The prior art is represented by the Tektronix VM5000HD Signal Set which modifies a test signal to solve the following problems:

for each measurement one line for all three component channels valid in both RGB and YPbPr for ramps and sweeps digital RGB cross-talk due to aliasing of Cb and Dr in 4:0:0 to 4:4:4 standards EAV and SAV meet specification even with missing samples macro-block boundaries However a "standard" decoder is used. Although there is no "standard" for encoding, the term here refers to the fact that an encoder is designed for general purpose encoding with no optimization for test signals for component analog video.

FIG. 1 illustrates an ideal overlay of RGB component analog test signals that have a sweep signal at a specific location within each video line. If displayed on a video monitor, a portion of several lines of the image for one of the components shown in FIG. 1, i.e., horizontally one-third of the image lines, appears as shown in FIG. 2 with frequency increasing from left to right. Each of the components would appear the same, and would follow on the same image lines so that, when combined, the pattern of FIG. 2 is repeated three times horizontally across the image. FIG. 3 shows a GBR parade view of one video line for each of the component waveforms after MPEG coding/decoding of the component analog test signals of FIG. 1. As may be seen from FIG. 3 there is extraneous signal content in the portion of the G" waveform that corresponds in location to the bursts for the B" and R" components. It is readily apparent that there is considerable cross-talk of blue into the green and red components, as well as to a lesser extent cross-talk from the green and red components into the blue component and green into the red component. This cross-talk is a result of the MPEG compression process, especially the conversion of 4:4:4 (RGB) video to 4:2:0 (chroma subsampled) video. The waveforms of the different component bursts vary as a result of the cross-talk also.

What is desired is a method of generating a single MPEG encoded sequence for multiple CAV measurements that solves all of the above-identified problems.

BRIEF SUMMARY OF THE INVENTION

Accordingly the present invention provides a method of generating an MPEG sequence for multiple component analog video measurements by modifying a general purpose encoder and providing a test signal that is valid in both RGB and YPbPr in both pulse and bar and that solves digital RGB cross-talk due to aliasing of Cb and Cr in 4:0:0 and 4:4:4 formats. The general purpose encoder is modified by removing vertical pre-filtering, altering quantization tables alternate scanning for vertical redundancy, and turning off motion estimation. The test signal is a matrix test signal without motion that has image boundaries corresponding to MPEG block encoding boundaries, i.e., has vertical redundancy, and that is pre-aliased to prevent or minimize digital cross-talk after MPEG compression by repeating every other sample. For aligning of the test signal, a modified decoder may be used that has modifications corresponding to those of the modified encoder. The test signal is subjected to MPEG compression and applied to a device under test (DUT) that outputs analog RGB for analysis by a measurement device.

The objects, advantages and other novel features of the present invention are apparent from the following detailed description when read in conjunction with the appended claims and attached drawing.

DETAILED DESCRIPTION OF THE INVENTION

The present invention provides a test signal that is valid in both RGB and YPbPr for both pulse and bar, and that solves digital RGB cross-talk due to aliasing of Cb and Cr in 4:0:0 to 4:4:4 standards. A general purpose encoder is modified by removing the vertical pre-filter, altering quantization tables alternated scanning for a vertical boundary, and turning off motion estimation. The encoder modifications are performed to take advantage of the vertical redundancy of repeating the same signal over several consecutive lines and repeating the same frame continuously, i.e., the test signal is a still image having vertical redundancy, preferably with image edges corresponding to compression block boundaries. The modified encoder optimizes the encoding of the matrix test signal, i.e., minimizes the bit stream. A decoder may also be modified similar to the modified encoder to verify modified encoder alignment with the test signal.

Test signal accuracy is sufficient to enable testing of component analog video from set-top boxes that take in compressed digital (MPEG) video. Frequency response, linearity, channel delay, cross-talk (discussed below) and short time distortion measurements are facilitated by producing one matrix test signal for all measurements and for both RGB and YPbPr component representations, and by ridding the MPEG encoded test signal of artifacts that otherwise would interfere to the point of not being practical.

This leaves the subject of producing an RGB component test signal as part of the matrix test signal for measuring cross-talk. The cross-talk portion of the matrix test signal is designed to be used in measuring channel to channel signal cross-talk over various frequencies. In order to create an RGB component analog signal that prevents or minimizes digital cross-talk after MPEG compression, pre-aliasing is used. The method of pre-aliasing is to repeat every other sample as follows, where "floor" is the integer portion of the resulting value:

$$\text{preAliasdR}_{line,n} = \text{Rline}_{line,floor(n/2)*2}$$

$$\text{preAliasdG}_{line,n} = \text{Gline}_{line,floor(n/2)*2}$$

$$\text{preAliasdB}_{line,n} = \text{Bline}_{line,floor(n/2)*2}$$

Figure 1:
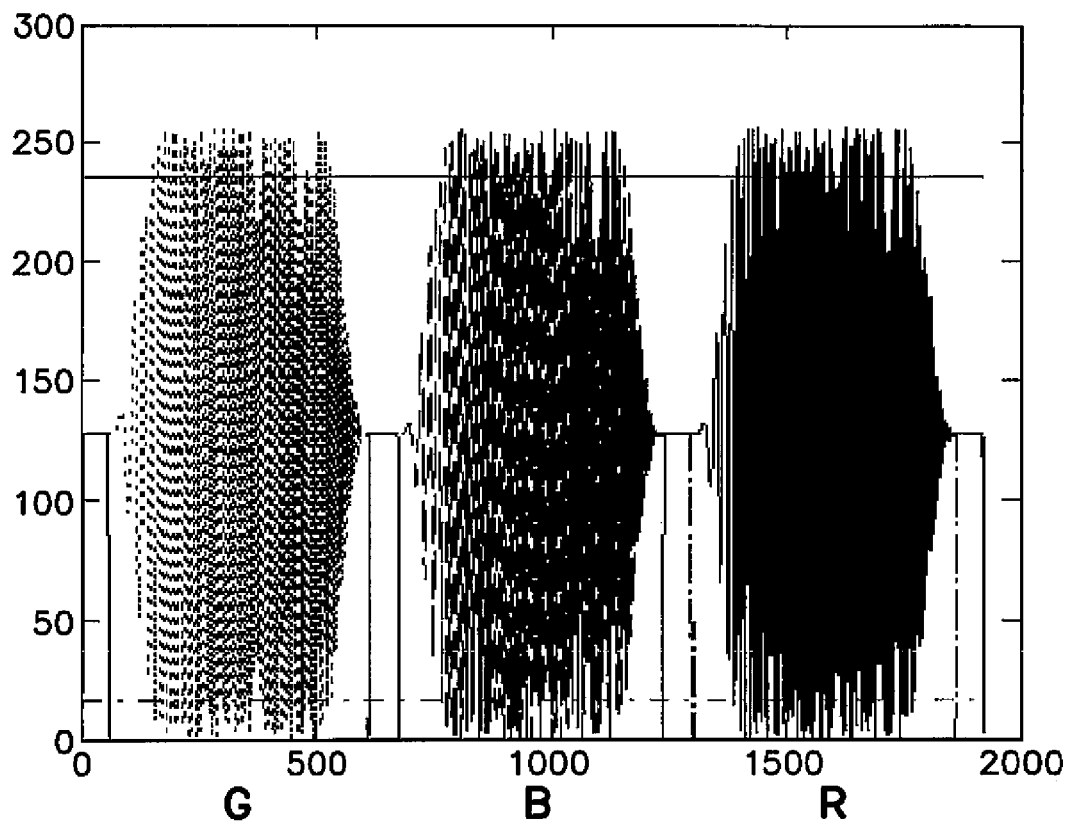
FIG. 1 is an overlay waveform display view of an original component analog test signal.
Figure 2:
FIG. 2 is an image display view of a portion of the image representing one-third of the horizontal display corresponding to one component of the original component analog test signal of FIG. 1.
Figure 3:
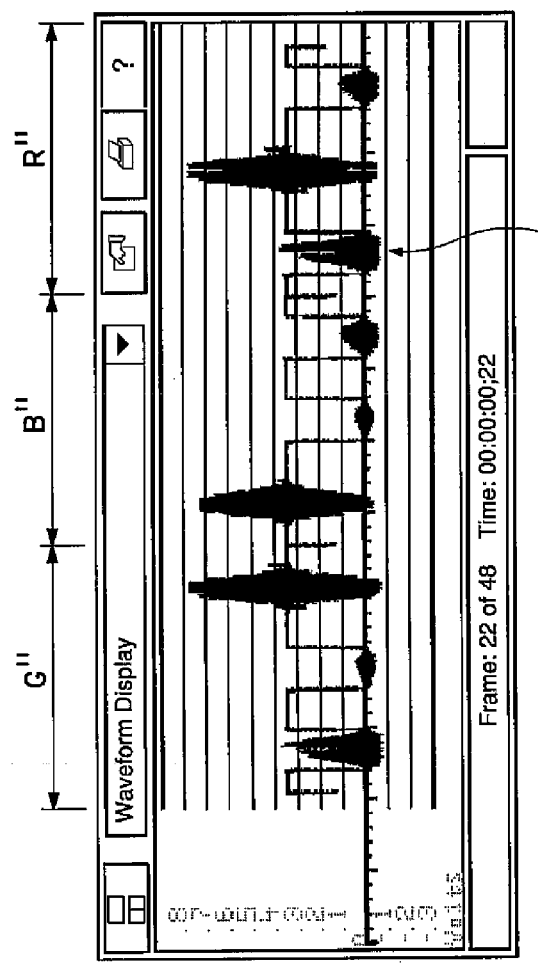
FIG. 3 is a GBR parade waveform display view of the original component analog test signal after MPEG encode/decode illustrating digital cross-talk between components.
Figure 4:
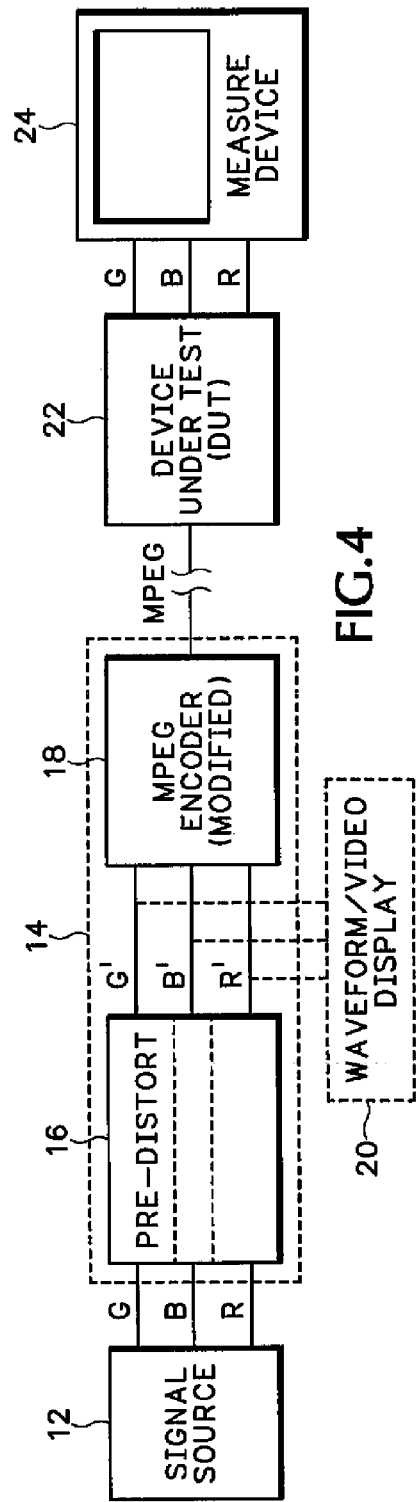
FIG. 4 is a block diagram view of a system for determining characteristics of a video system having an MPEG encode input and producing an analog RGB output using a component analog test signal according to the present invention.
Figure 5:
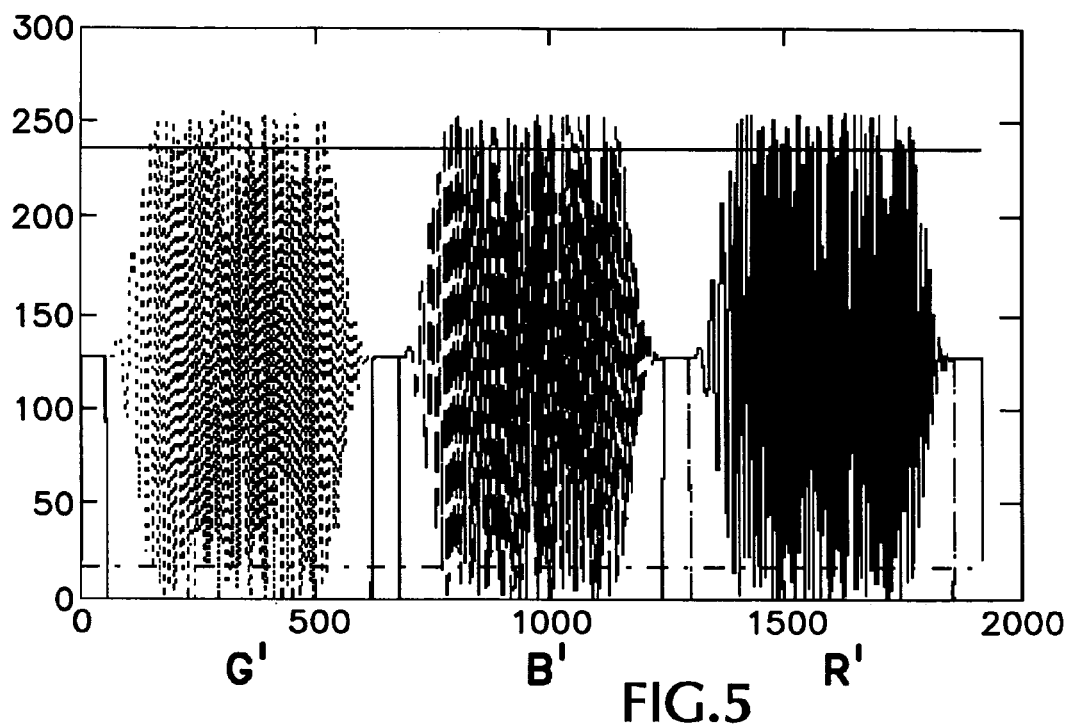
FIG. 5 is an overlay waveform display view of a pre-aliased component analog test signal according to the present invention.
Figure 6:
FIG. 6 is an image display view corresponding to FIG. 2 using the pre-aliased component test signal of FIG. 5 according to the present invention.
Figure 7:
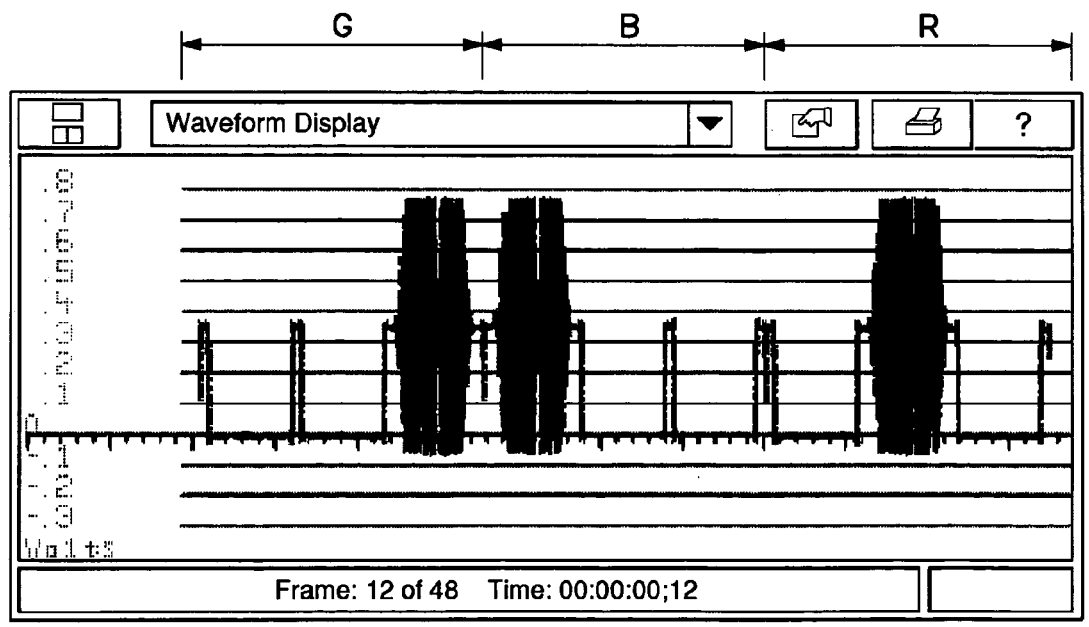
FIG. 7 is a GBR parade waveform display view of the pre-aliased component test signal after MPEG encode/decode according to the present invention.

Referring now to FIG. 4 a signal source 12 provides an original component analog test signal, such as that shown in FIG. 1. The test signal is then input to an MPEG encoder 14 that has a pre-aliasing section 16 for each component and a modified MPEG encoder 18 as described above. The pre-aliased component waveforms are shown in FIG. 5 prior to actual encoding, and the corresponding image portion for one component is shown in FIG. 6, as would be shown if a waveform/monitor device 20 was used to look at the signals after pre-aliasing and prior to encoding. The differences between the original and pre-aliased component analog test signals are more noticeable by comparing the images of FIGS. 2 and 6. The resulting MPEG sequence from the MPEG encoder 14 is input to an device under test (DUT) 22. The decoded RGB component analog signals are then input to a measurement device 24 that provides a GBR parade display of the analog components as shown in FIG. 7. Comparing the waveforms of FIGS. 3 and 7 it is apparent that the pre-aliasing of the component analog test signal results in elimination of the digital cross-talk caused by the MPEG encoding/decoding. This enables accurate CAV measurements for a video system that is free of cross-talk artifacts produced by the encoding/decoding process.

The pre-aliasing may be used in conjunction with a "standard" encoder to minimize cross-talk, but the combination of the modified encoder 18 with the pre-aliased signal essentially prevents cross-talk.

Thus every other sample of the original sweep is used and repeated in each channel. This causes aliasing, but it prevents the MPEG induced digital cross-talk. This allows measurement of the analog RGB cross-talk from a set-top box RGB output, for example, that otherwise was not possible.

What is claimed is:

1. A method of generating an MPEG sequence for multiple component analog video measurements comprising the steps of:

modifying a general purpose encoder by removing vertical pre-filtering, altering quantization tables and turning off motion estimation to take advantage of vertical and frame redundancies in a matrix test signal represented by the MPEG sequence; and pre-aliasing a component analog test signal prior to encoding by the modified encoder to produce the MPEG sequence, the pre-aliasing preventing digital cross-talk caused by MPEG coding/decoding so that accurate component analog video measurements may be made on the resulting component analog test signal after processing by a video system that includes MPEG coding/decoding.

2. The method as recited in claim 1 wherein the pre-aliasing step comprises the step of repeating every other sample of the test signal as follows:

$$\text{preAliasdR}_{line,n} = \text{Rline}_{line,floor(n/2)*2}$$

$$\text{preAliasdG}_{line,n} = \text{Gline}_{line,floor(n/2)*2}$$

$$\text{preAliasdB}_{line,n} = \text{Bline}_{line,floor(n/2)*2}.$$

3. A method of testing a device under test that has an MPEG signal as an input and provides an analog component signal as an output comprising the steps of:

generating a matrix test signal in the form of a signal having vertical and frame redundancies, with edges of the image represented by the matrix test signal corresponding to block boundaries of an MPEG encoder;

modifying the MPEG encoder to optimize encoding of the matrix test signal to produce the MPEG signal for input to the device under test; and measuring characteristics of the analog component signal from the device under test to determine deviations from matrix test signal caused by the device under test.

4. The method as recited in claim 3 wherein the generating step comprises the step of pre-aliasing an ideal analog component signal to prevent cross-talk between component channels due to MPEG encoding/decoding to produce a pre-aliased test signal as a portion of the matrix test signal.

* * * * *